Dec. 6, 1938.     E. KARFIOL     2,138,926
MOTH SNARE
Filed June 26, 1937
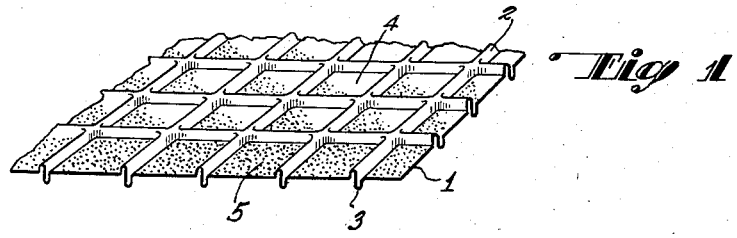
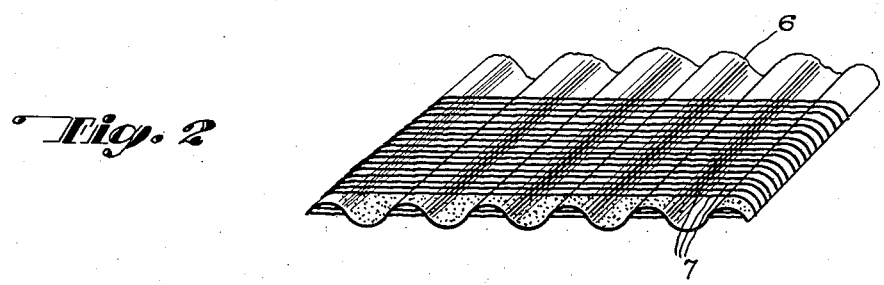
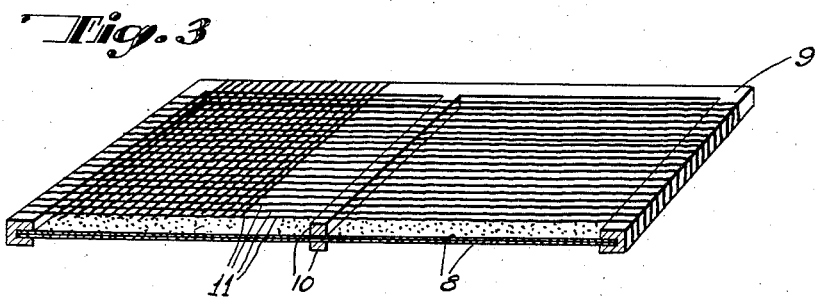
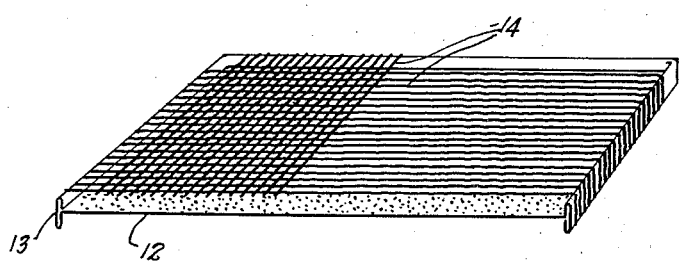
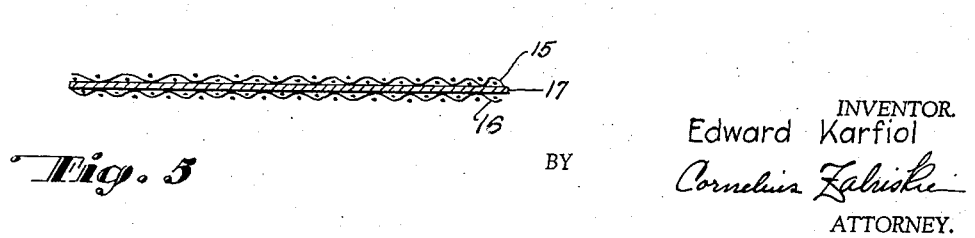
INVENTOR.
Edward Karfiol
BY
ATTORNEY.

Patented Dec. 6, 1938

2,138,926

UNITED STATES PATENT OFFICE 2,138,926

MOTH SNARE

Edward Karfiol, Great Neck, N. Y.

Application June 26, 1937, Serial No. 150,481

4 Claims. (Cl. 43—114)

This invention is a moth catcher adapted to be used in closets, trunks and other receptacle and containers where woolen articles are kept or stored, and the object of the invention is to catch and hold in a permanent manner any moths that may be present in such closet, container or receptacle.

It has long been the practice to use so-called moth balls or other highly odorous mediums as moth repellents, but to most persons the odors of these repellents are obnoxious and altogether undesirable and, before clothes can be satisfactorily worn after subjecting them to such odors, it is necessary to air them for a period, so that the odors with which they are permeated may be dissipated. On the other hand, the common practice of mothproofing garments through the employment of moth toxic substances, primarily intended to kill the larvae, have not proven satisfactory because these treatments must be frequently administered for they are not durable in character. After many tests and research into the habits of moths, as well as prior methods and procedures for their destruction, I have become convinced that the most satisfactory way to eliminate them is to positively catch and hold them.

According to the present invention, I provide a sticky substance with which is associated means which will attract the moths into contact with the sticky substance, so that they will be thus trapped and held in place.

In practically carrying out the invention, the device may conveniently be made in the form of a sheet of suitable material to one or both sides of which may be applied a sticky, tacky material, such, for example, as is commonly employed on fly paper. Over the surface of such sheet, and preferably in spaced relation to the greater portion of the surface thereof, is wrapped or otherwise positioned fabric material, such as woolen material adapted to protect articles which may come in contact with the device from engaging with or adhering to the sticky material thereon. The woolen fabric employed may be woven, knitted or may be merely in the form of yarn, string, cords or tufts and thus serves not only to attract the moths but also acts as a guard against contact of extraneous articles with the sticky material.

I may also, if desired, impregnate the fabric with some substance, such as an oil or grease, which will serve to attract the moth to the device, but this is not essential. In the preferred form of this invention, however, the device should be made with openings and cavities for I have found a marked tendency on the part of moths to hide away in relatively closed or dark places in the daytime. By providing the device with such places, it becomes, for this reason, in addition to the others specified, attractive to moths.

My experience with the device of this invention has shown that when, for example, one of these devices is positioned on the floor of a closet, the moths entering the closet will be attracted thereto and large numbers of moths have been caught in this way in tests which I have carried on.

Features of the invention, other than those specified, will be apparent from the hereinafter detailed description and claims, when read in conjunction with the accompanying drawing.

The accompanying drawing illustrates different practical embodiments of the invention, but the constructions therein shown are to be understood as illustrative, only, and not as defining the limits of the invention.

Figure 1 is a fragmental perspective showing of a portion of a device made in accordance with the present invention.

Figures 2, 3, and 4 are similar views showing modified forms of construction.

Figure 5 is a sectional view showing another form of the invention.

In the construction of Figure 1, the device is shown as embodying a sheet of material 1 which constitutes the core of the device. It may be of metal, wood, fibre or the like, but paper or paper mache may be economically employed for this purpose. Its shape may vary within wide limits but in the showing here made, the core is pressed into a waffle form providing raised ribs 2 and 3 at the opposite faces of the sheet intersecting at right angles to form intervening spaces 4. The surfaces of these spaces 4 are coated with a sticky, tacky material, such as is commonly used on sticky fly paper of the "Tanglefoot" type and this coating, indicated generally by the reference character 5, may be limited to the bases of the recesses or the entire surface or surfaces of the sheet, including the surfaces of the ribs, may be coated if desired.

Ribs are shown at both sides of the sheet or core and this is the preferred construction, although they may be formed at one side only and may be disposed in other relation than the right angular formation shown in this figure.

One or both of the surfaces of the core sheet is covered with a relatively coarse foraminous fabric, preferably of wool yarn, in which case, if desired, the entire surfaces of the core may be coated with the sticky material to hold the yarn in place. Such a fabric is shown in Figure 2 where the core sheet, indicated at 6, is corrugated instead of waffle form with one or both faces of the sheet coated with the sticky material and wrapped about this sheet in either one or both directions are strands or cords of woolen yarn 7, held in place by the sticky material, but serving to space such sticky material from any article which may be brought in contact with the yarn.

In Figure 3, two flat core sheets 8 are placed back to back with their exterior faces coated or impregnated with the sticky material and these sheets are supported in a marginal frame 9 having transverse braces 10. The yarn or fabric is wrapped about the frame in both directions, as indicated at 11, and is spaced from contact with the sticky material by virtue of the depth of the frame in which the core sheets 8 are medially disposed.

In the structure of Figure 4, the core sheet 12 is provided with marginal flanges 13 which serve as spacers for the strands of yarn 14 which are wrapped about this frame. The sticky material is applied to one or both faces of the body of the core sheet 12 as hereinbefore described.

The fabric which may be used in any of the foregoing constructions may be a loose woven fabric, if desired, or may simply be in the form of strands of yarn wrapped about the frame or core sheet and held in place either by the sticky material to which I have referred or by independent means, such as by gluing it to the frame or sheet.

The fabric referred to in each instance serves to guard the sticky material from contact with other articles and if this material is made from wool or other substance which is attractive to moths, it will also serve as a bait. However, it is within the purview of this invention to make the fabric of metal or other material than wool, so that it will serve purely as a guard and to incorporate wool into the core members or make the core member in whole or in part of wool or other moth attractive material to act as bait.

In the structures which I have hereinbefore described the device comprises a core member on which the fabric is supported, but a core member is not essential to the operativeness of this invention. For example, in Figure 5, I have shown a construction wherein two sheets or pieces of loosely woven or knitted fabric 15 and 16 are laminated with an interposed layer of sticky, tacky material 17. Such an arrangement can be readily accomplished by coating one or both of the abutting faces of the fabric with a sticky material and then simply superimposing the plies with the sticky material between them. In this construction each of the pieces of fabric serves as a backing for the other and both protect the interposed sticky material from contact with other objects while providing openings into which moths may crawl to be caught and trapped by the interposed sticky substance. This construction may be readily made flexible for convenience in packaging or for other reasons.

Tests have shown that moths are attracted by animal grease or fats and, in some instances, I have impregnated the fibres or yarn with animal fats or grease to impart thereto an odor which, although not perceptible to the human smell, assists in the attraction of moths to the device.

In the foregoing constructions where a covering or guard is used, it should be of sufficiently open texture, weave or spacing to permit the moths to readily crawl through the interstices thereof, into engagement with the sticky material and there appears to be a marked tendency of moths to do this for they apparently attempt to crawl away from the light in the daytime into dark or secluded places, apparently to hide away. The device of this invention caters to their habits in this regard by providing a myriad of apparent hideaways into which the moths will enter to be trapped and permanently caught by engagement with the sticky substance.

The device may be made flexible or rigid and it appears to operate with thorough satisfaction in either case, particularly as the surfaces are protected against sticking to extraneous articles. The devices described may be laid on the floor or shelves of a closet or hung on the walls thereof or may be placed in trunks, drawers or other enclosures where moths are apt to enter and destroy articles or wearing apparel. Experience has shown that moths will be attracted to the device of the present invention in preference to ordinary articles of wearing apparel that may be in the vicinity. When thus attracted, they become entrapped and cannot escape. If they lay their eggs on or within the device, the resulting larvae will in turn become entrapped when the eggs are hatched.

In the foregoing detailed description, I have not attempted to deal with all the ramifications of this invention, which obviously can partake of various modified forms, without departing from the inventive concept thereof, and accordingly the invention is to be understood as fully commensurate with the appended claims.

Having thus fully described the invention, what I claim as new and desire to secure by Letters Patent is:

1. A moth snare comprising a core member coated with a sticky, tacky material, and a protective woolen fabric covering said sticky material having openings therein through which moths may pass.

2. A moth snare comprising a core member having a coating of sticky, tacky material and positioned within a foraminous fabric envelope of wool.

3. A moth snare comprising a core member coated with a sticky, tacky material and positioned within a foraminous envelope of material attractive to moths and edible by moth larvae.

4. A moth snare comprising a body of sticky, tacky material covered by a foraminous envelope of material attractive to moths and edible by moth larvae and adhesively engaged by said sticky, tacky material.

EDWARD KARFIOL.